(12) United States Patent
Silvey et al.

(10) Patent No.: US 12,447,492 B1
(45) Date of Patent: Oct. 21, 2025

(54) THERMAL SPRAYED ENGINE BLOCK REMANUFACTURING

(71) Applicant: FCA US LLC, Auburn Hills, MI (US)

(72) Inventors: Bryce W Silvey, Auburn Hills, MI (US); Martin S Kramer, Auburn Hills, MI (US)

(73) Assignee: FCA LLC, Auburn Hills, MI (US)

( * ) Notice: Subject to any disclaimer, the term of this patent is extended or adjusted under 35 U.S.C. 154(b) by 0 days.

(21) Appl. No.: 19/042,143

(22) Filed: Jan. 31, 2025

(51) Int. Cl.
| | | |
|---|---|---|
| *B23K 26/362* | (2014.01) | |
| *B05B 13/06* | (2006.01) | |
| *B23K 26/36* | (2014.01) | |
| *B23P 6/02* | (2006.01) | |
| *B23K 26/40* | (2014.01) | |

(52) U.S. Cl.
CPC ............. *B05B 13/06* (2013.01); *B23K 26/36* (2013.01); *B23K 26/362* (2013.01); *B23P 6/02* (2013.01); *B23K 26/40* (2013.01); *B23P 2700/50* (2013.01); *Y10T 29/49233* (2015.01); *Y10T 29/49272* (2015.01); *Y10T 29/49728* (2015.01); *Y10T 29/49746* (2015.01)

(58) Field of Classification Search
CPC ...... B23P 6/02; B23P 2700/50; B23K 26/362; B23K 26/40; Y10T 29/49233; Y10T 29/49272; Y10T 29/49728; Y10T 29/49746
See application file for complete search history.

(56) References Cited

U.S. PATENT DOCUMENTS

| | | | | |
|---|---|---|---|---|
| 5,080,056 A | * | 1/1992 | Kramer | F02F 7/0007 29/888.048 |
| 5,271,967 A | * | 12/1993 | Kramer | C23C 4/12 427/236 |
| 5,466,906 A | * | 11/1995 | McCune, Jr. | B23K 9/048 219/121.52 |
| 2003/0113472 A1 | * | 6/2003 | Byrnes | C23C 4/16 427/230 |
| 2003/0152698 A1 | * | 8/2003 | Smith | C23C 4/08 427/236 |
| 2003/0160109 A1 | * | 8/2003 | Byrnes | B05B 7/203 239/84 |
| 2006/0026831 A1 | * | 2/2006 | Boehm | B24C 3/325 29/888.061 |
| 2006/0027206 A1 | * | 2/2006 | Boehm | C23C 4/12 427/446 |

(Continued)

FOREIGN PATENT DOCUMENTS

| | | | | |
|---|---|---|---|---|
| DE | 102014207263 A1 | * | 10/2014 | ........... B23K 26/389 |
| FR | 2973722 A1 | * | 10/2012 | ............. F02B 79/00 |

*Primary Examiner* — Jermie E Cozart
(74) *Attorney, Agent, or Firm* — Jeremy J. Klobucar

(57) ABSTRACT

A method of remanufacturing an engine block includes providing an engine block having at least one cylinder bore with a bore interior surface having a thermal spray coating deposited thereon, determining at least a portion of the thermal spray coating is out of specification, performing a laser texture ablation (LTA) process on the thermal spray coating to remove at least a portion of the thermal spray coating and leave a textured surface, and performing a thermal spray coating operation by spraying an additional thermal spray coating on the textured surface, to thereby prevent scrapping of the engine block with the out of specification thermal spray coating.

20 Claims, 3 Drawing Sheets

(56) References Cited

U.S. PATENT DOCUMENTS

| | | | |
|---|---|---|---|
| 2007/0190272 A1* | 8/2007 | Kanai | B05B 13/0636 |
| | | | 427/446 |
| 2018/0141136 A1* | 5/2018 | Agapiou | C23C 4/131 |
| 2018/0283310 A1* | 10/2018 | Li | C23C 28/021 |
| 2019/0040514 A1* | 2/2019 | Han | C23C 4/134 |
| 2019/0085786 A1* | 3/2019 | Petrus | C22F 1/05 |

\* cited by examiner

THERMAL SPRAYED ENGINE BLOCK REMANUFACTURING

FIELD

The present application relates generally to internal combustion engines and, more particularly, to remanufacturing systems and methods for thermal sprayed engine blocks.

BACKGROUND

Some internal combustion engines include cylinder bore walls made of a material configured to withstand the abrasive action of the combustion seal rings of a reciprocating piston. In traditional cast iron engine blocks, the cast iron material provides sufficient wear resistance to the seal rings. However, some engine blocks are cast from a lighter material, such as aluminum, and require a thermal spray coating liner to be sprayed into the cylinder bores to provide the required wear resistance. During such manufacturing, some of these spray bore liners may be rejected, for example, due to excessive porosity or poor clean up, resulting in surface finishes that are out of specification. One conventional approach with out of specification units is to scrap and remelt the entire engine block, which is wasteful and time consuming. Thus, while such manufacturing processes do work well for their intended purpose, there remains a desire for improvement in the relevant art.

SUMMARY

According to one example aspect of the invention, a method of remanufacturing an engine block is provided. In one example configuration, the method includes providing an engine block having at least one cylinder bore with a bore interior surface having a thermal spray coating deposited thereon, determining at least a portion of the thermal spray coating is out of specification, performing a laser texture ablation (LTA) process on the thermal spray coating to remove at least a portion of the thermal spray coating and leave a textured surface, and performing a thermal spray coating operation by spraying an additional thermal spray coating on the textured surface, to thereby prevent scrapping of the engine block with the out of specification thermal spray coating.

In addition to the foregoing, the described method may include one or more of the following features: performing a honing operation on the additional thermal spray coating to provide a surface finish and final dimensional size to accept a piston and ring assembly; wherein the thermal spray coating has a thickness of approximately 150 microns; wherein the LTA process removes approximately 50 microns of thickness of the thermal spray coating; wherein the additional thermal spray coating has a thickness of at least approximately 50 microns; wherein the LTA process removes between approximately 30% and approximately 50% of a thickness of the thermal spray coating; wherein the LTA process removes approximately one third of a thickness of the thermal spray coating; wherein the LTA process removes between approximately 50% and approximately 80% of a thickness of the thermal spray coating; wherein the LTA process cleans the textured surface of contaminants; and wherein the LTA process is performed with an LTA tooling having one or more lasers.

According to another example aspect of the invention, a method of manufacturing an engine block to prevent scrapping of an out of specification engine block is provided. In one example configuration, the method includes providing an unfinished engine block having at least one cylinder bore, performing a pre-bore operation on the at least one cylinder bore, performing a surface activation operation to provide a textured substrate surface in the at least one cylinder bore, performing a first thermal spray coating operation to deposit a first thermal spray coating on the textured substrate surface, and performing a honing operation on the at least one cylinder bore. The method further includes determining at least a portion of the first thermal spray coating is out of specification, performing a laser texture ablation (LTA) process on the first thermal spray coating to remove at least a portion of the first thermal spray coating and leave a textured surface, and performing a second thermal spray coating operation by spraying a second thermal spray coating on the textured surface of the first thermal spray coating, to thereby prevent scrapping of the engine block with the out of specification thermal spray coating.

In addition to the foregoing, the described method may include one or more of the following features: performing a honing operation on the second thermal spray coating to provide a surface finish and final dimensional size to accept a piston and ring assembly; wherein the first thermal spray coating has a thickness of approximately 150 microns; wherein the LTA process removes approximately 50 microns of thickness of the first thermal spray coating; wherein the second thermal spray coating has a thickness of at least approximately 50 microns; and wherein the LTA process removes between approximately 30% and approximately 50% of a thickness of the first thermal spray coating.

In addition to the foregoing, the described method may include one or more of the following features: wherein the LTA process removes approximately one third of a thickness of the first thermal spray coating; wherein the LTA process removes between approximately 50% and approximately 80% of a thickness of the first thermal spray coating; wherein the LTA process cleans the textured surface of contaminants; and wherein the LTA process is performed with an LTA tooling having one or more lasers.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously described, some engine blocks are cast from a relatively light material, such as aluminum, and require a thermal spray coating liner to be sprayed into the cylinder bores to provide the required wear resistance against pistons reciprocating therein. However, during such engine block manufacturing, some of these spray bore liners may be rejected, for example, due to excessive porosity or poor clean up, resulting in surface finishes that are out of specification. One conventional approach with out of specification units is to scrap and remelt the entire engine block, which is wasteful and time consuming. In some cases, the scrap rate may be relatively significant and result in a substantial loss of revenue.

Accordingly, the present application is directed to systems and methods for "remanufacturing" an engine block with out-of-specification thermal spray bore liners. In general, the method includes utilizing a Laser Texture Ablation (LTA) technique to roughen and remove some or all of the rejected honed thermal spray liner surface. In this way, the process performs a cleaning/coating removal and texturing of the honed surface such that the surface can receive a new thermal spray coating on top of the previous coating. In one example, approximately 50 microns is removed via the LTA technique, and approximately 100 microns of new thermal spray coating is applied to the LTA surface. The thermal sprayed part is then cleaned of over-spray and goes through another final machining (honing) so the engine block can be assembled. As such, the out-of-spec engine block may be remanufactured, rather than scrapping the part, thereby preserving material, time, and cost.

Figure 1:
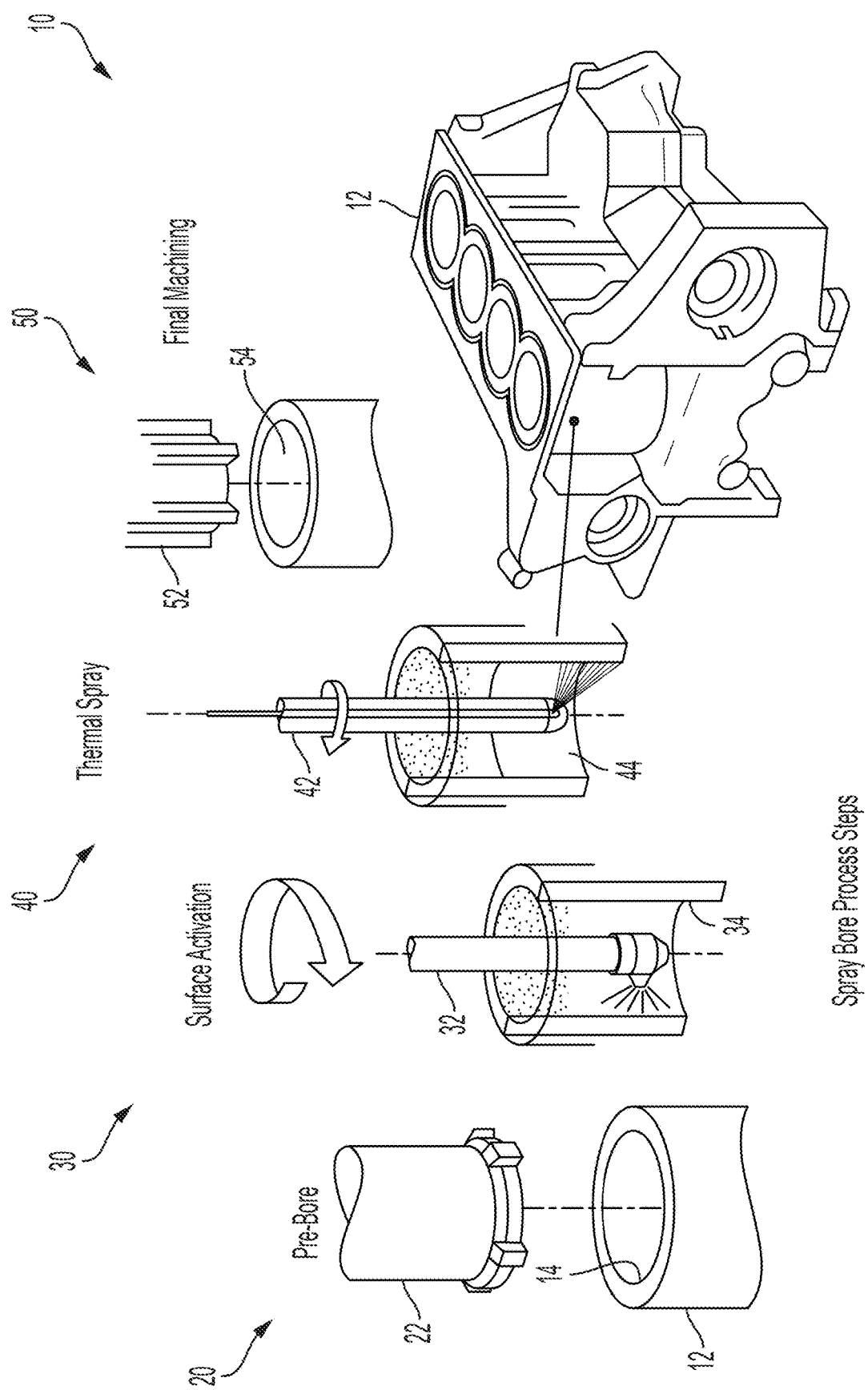
FIG. 1 is a perspective view of an example cylinder bore liner forming process for an engine block, in accordance with the principles of the present disclosure.

Referring now to the drawings, FIG. 1 illustrates an example thermal spray bore liner manufacturing process for an engine block 10 having a plurality of cylinder bores 12 each having an interior surface 14. In the example embodiment, the engine block 10 is manufactured and provided, for example, as an in-line die cast aluminum four-cylinder engine block. However, it will be appreciated that engine block 10 may be manufactured from various other materials and have various other arrangements or configurations. In the example implementation, at 20, the engine block 10 undergoes a pre-bore operation where a boring tool 22 is inserted into each cylinder bore 12 and used to set a pre-activation bore size, which facilitates determining a coating thickness based on final hone dimensions.

In the example embodiment, at 30, the engine block 10 undergoes a surface activation operation where a tool 32 is inserted into each cylinder bore 12 and used to create a surface which a thermal spray coating can adhere and bond to. In one example, the tool 32 forms a "roughed" or textured substrate surface 34 on the bore interior surface 14, such as a micro dovetail pattern. The tool 32 may have various forms such as, for example, a grit blasting tool, a mechanical machining tool, a high pressure waterjet abrasion tool, a laser tool, etc. It will be appreciated that tool 32 may be any suitable tool that enables creation of a precise activated surface that enables the thermal spray coating to adhere/bond to the cylinder bore surface.

At 40, the engine block 10 undergoes a thermal spray operation where a tool 42 is inserted into each cylinder bore 12 and sprays a thermal spray coating 44 on the activated bore interior surface 34. In the example embodiment, the activated bore interior surface 34 includes the textured (i.e., not smooth) surface formed by the surface activation operation 30. In this way, the roughed/textured bore interior surface 14 facilitates a strong bond between the thermal spray coating and the cylinder bore 12 than if the interior surface 14 were smooth with a low-textured surface.

In one example, the thermal spray coating 44 has a thickness of approximately 150 microns. The microstructure of the thermal spray coating 44 may be a composite of martensitic alloy steel and iron oxides making it a Cermet material. The thermal spray coating 44 is bonded to the bore interior surface 14 with a minimum adhesion strength of approximately 30 MPa and normal ranges between approximately 40 MPa and approximately 50 MPa. The thermal spray coating 44 may have a hardness of approximately 320 Vickers with ten times the wear resistance of grey cast iron. The thermal spray coating 44 may have small pockets of natural porosity that aid in tribological lubrication with excellent thermal conductivity to the engine block interface, thereby allowing high density powertrain applications (e.g., high horsepower).

In the example implementation, at 50, the engine block 10 undergoes a final machining (honing) operation where a machining tool 52 is inserted into each cylinder bore 12 and machines the thermal spray coating 44 to form a smooth interior surface 54 configured to contact the engine pistons (not shown).

Figure 2:
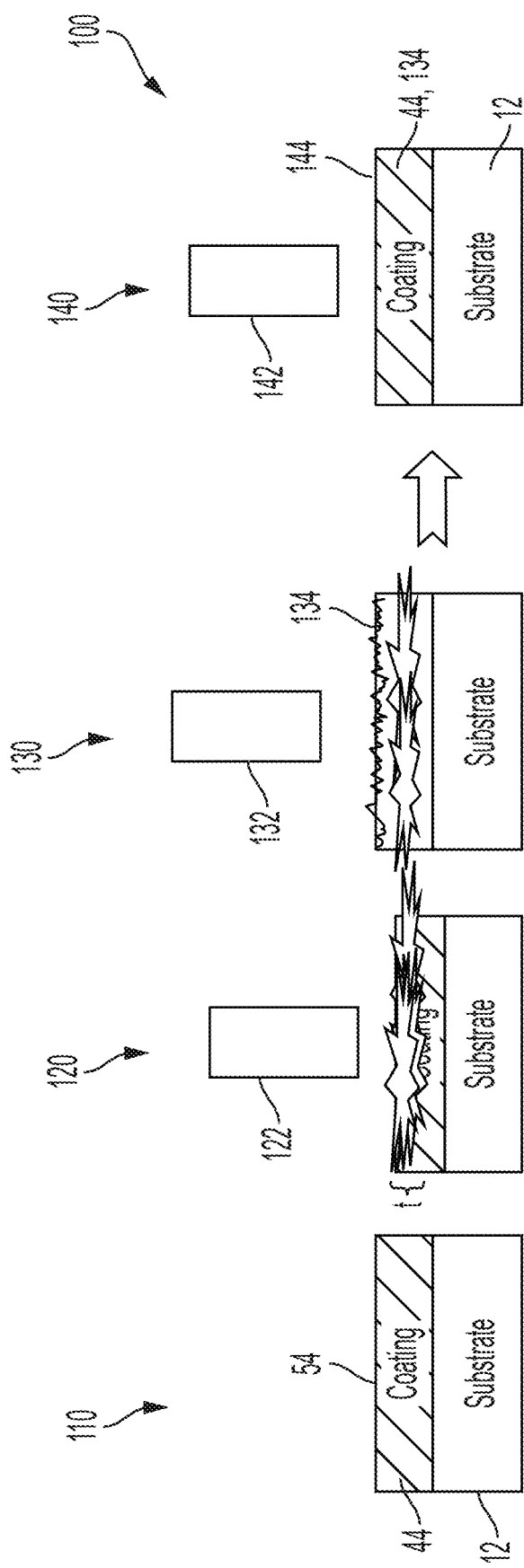
FIG. 2 is a schematic illustration of a thermal spray bore liner remanufacturing process, in accordance with the principles of the present disclosure.

With additional reference to FIG. 2, an example remanufacturing process 100 for an out of specification engine block 10 will be described in more detail. As previously discussed, the engine block 10 may be manufactured with a thermal spray coating 44 by the process described in FIG. 1 or by another process. However, in some cases, the engine block 10 may be rejected because the thermal sprayed cylinder bores 12 are out of specification, for example, due to excessive porosity or a poor cleanup. Rather than scrap the engine block, the remanufacturing process 100 may be performed to reclaim the component.

In the example embodiment, at 110, the engine block 10 is formed with cylinder bores 12 having the thermal spray coating 44 (e.g., FIG. 1), but the thermal spray coating 44 is out of specification. Once this out of specification is detected, the engine block 10 is removed from the manufacturing line and sent to a remanufacturing line (not shown). At 120, an LTA process is then performed on the out of spec thermal spray coating 44 using a tool 122 such as, for example, a Laser Textures Activation spindle. The LTA tool 122 is inserted into each out of spec cylinder bore 12 and one or more lasers are utilized to roughen and remove some or all of the honed thermal spray coating 44. This process removes, cleans, and textures at least a portion of the thermal spray coating 44.

More specifically, in one example embodiment, the one or more lasers of the LTA process 120 are configured to (i) clean the thermal spray coating interior surface 54 of contaminates (e.g., oils, carbon, etc.), which is a fundamental requirement to achieve metallurgical diffusion and bonding, (ii) remove at least a portion of the previously sprayed thermal coating 44, and (iii) create a textured surface on the remaining thermal spray coating 44 to receive a second thermal spray coating that will metallurgically bond together and form a single coating layer comprised of the old and new sprayed thermal coating layers.

The LTA process 120 may be performed on the entire interior surface 54 or only a predetermined portion thereof. Moreover, the LTA process 120 may remove the entire thermal spray coating 44 or only a predetermined portion (e.g., thickness 't') thereof. In one example, between approximately 30% and approximately 40% of the thickness of the thermal spray coating 44 is removed in the LTA process 120, or between 30% and 40% of the thickness of the thermal spray coating 44 is removed in the LTA process. In another example, approximately ⅓ of the thickness, or ⅓ of the thickness of the thermal spray coating 44 is removed.

In yet another example, between approximately 40% and approximately 60% of the thickness of the thermal spray coating 44 is removed in the LTA process 120, or between 40% and 60% of the thickness of the thermal spray coating 44 is removed in the LTA process. In another example, approximately 50% of the thickness, or 50% of the thickness of the thermal spray coating 44 is removed. In another example, between approximately 60% and approximately 70% of the thickness of the thermal spray coating 44 is removed in the LTA process 120, or between 60% and 70% of the thickness of the thermal spray coating 44 is removed in the LTA process. In another example, approximately ⅔ of the thickness, or ⅔ of the thickness of the thermal spray coating 44 is removed. In yet another example, between approximately 70% and approximately 80% of the thickness of the thermal spray coating 44 is removed in the LTA process 120, or between 70% and 80% of the thickness of the thermal spray coating 44 is removed in the LTA process. In another example, approximately 75% of the thickness, or 75% of the thickness of the thermal spray coating 44 is removed.

In the example embodiment, at 130, the engine block 10 undergoes a second thermal spray coating operation where a tool 132 is inserted into each cylinder bore 12 that underwent the LTA process 120 to remove at least a portion of the initial thermal spray coating 44. Once inserted, the tool 132 sprays an additional thermal spray coating 134 on the thermal spray coating 44 textured by the LTA process 120. In one example, the thickness of the additional thermal spray coating 134 is sufficient to achieve the original intended thickness of the initial thermal spray coating 44. For example, if 20% of the thickness of the initial thermal spray coating 44 is removed via the LTA process 120, at least that thickness amount (20%) is added via the second thermal spray operation 130. At this point, the coating on the cylinder bores 12 is in the as-sprayed condition and will require final honing to return the cylinder bores 12 to the surface finish requirements and final dimensional size to accept piston and ring assemblies (not shown). As such, at 140, the engine block 10 undergoes a second final machining (honing) operation where a machining tool 142 (e.g., machining tool 52) is inserted into each cylinder bore 12 and machines the thermal spray coating 134 to form a smooth interior surface 144 sized and shaped to receive the piston and ring assemblies.

Figure 3:
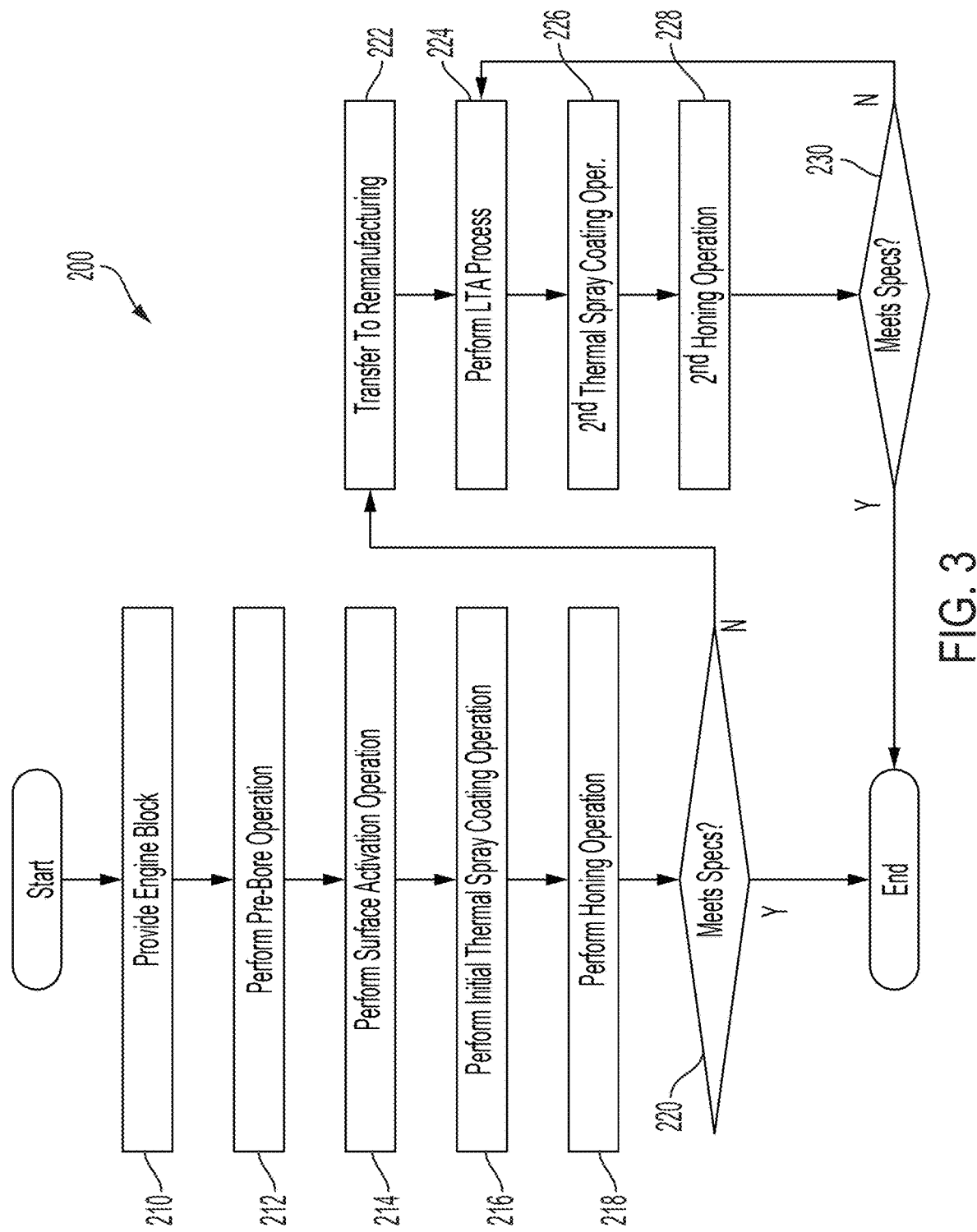
FIG. 3 is a flow diagram of an example engine block remanufacturing process, in accordance with the principles of the present disclosure.

With reference now to FIG. 3, an example method 200 of manufacturing and remanufacturing engine block 10 is illustrated according to the principles of the present application. In the example embodiment, the method begins at 210 where the engine block 10 is provided or formed, for example, via casting. At 212, a pre-bore operation is performed on each cylinder bore 12. At 214, a surface activation operation is performed on each cylinder bore 12 to provide a textured interior surface in each cylinder bore 12. At 216, an initial thermal spray coating operation is performed to provide a thermal spray coating 44 within each cylinder bore 12. At 218, a final machining (honing) operation is performed in each cylinder bore 12 to size and shape the cylinder bores 12 to receive the piston and ring assemblies.

At 220, it is determined if the thermally sprayed cylinder bores 12 meet one or more predetermined specifications. If yes, the method ends. If no, at 222, the engine block 10 is transferred to a remanufacturing line/operation. At 224, an LTA process is performed on each of the out of specification thermally sprayed cylinder bores 12 to remove at least a portion of the thermal spray coating 44 and clean and texture the remaining coating surface. At 226, a second thermal spray coating operation is performed to provide a new thermal spray coating 134. At 228, a second final machining (honing) operation is performed in each cylinder bore 12 to size and shape the cylinder bores 12 to receive the piston and ring assemblies. At 230, it is determined if the cylinder bores 12 with the new thermal spray coating 134 meet the one or more predetermined specifications. If yes, the method ends. If no, the method returns to 224.

Described herein are systems and methods for manufacturing an engine block with cylinder bores having spray bore liners and, if necessary, remanufacturing the engine block if the spray bore liners are out of specification. The remanufacturing process is configured to remove at least a portion of the spray bore liner via a laser texture ablation (LTA) process, and subsequently deposit a new spray bore liner coating with the original bore dimensions. The LTA process advantageously yields a cost and quality improvement when either scrap is created in the factory or an engine block is returned from the field.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A method of remanufacturing an engine block, the method comprising:
   providing an engine block having at least one cylinder bore with a bore interior surface having a thermal spray coating deposited thereon;
   determining at least a portion of the thermal spray coating is out of specification;
   performing a laser texture ablation (LTA) process on the thermal spray coating to remove at least a portion of the thermal spray coating and leave a textured surface; and
   performing a thermal spray coating operation by spraying an additional thermal spray coating on the textured surface, to thereby prevent scrapping of the engine block with the out of specification thermal spray coating.

2. The method of claim 1, further comprising performing a honing operation on the additional thermal spray coating to provide a surface finish and final dimensional size to accept a piston and ring assembly.

3. The method of claim 1, wherein the thermal spray coating has a thickness of approximately 150 microns.

4. The method of claim 3, wherein the LTA process removes approximately 50 microns of thickness of the thermal spray coating.

5. The method of claim 4, wherein the additional thermal spray coating has a thickness of at least approximately 50 microns.

6. The method of claim 1, wherein the LTA process removes between approximately 30% and approximately 50% of a thickness of the thermal spray coating.

7. The method of claim 1, wherein the LTA process removes approximately one third of a thickness of the thermal spray coating.

8. The method of claim 1, wherein the LTA process removes between approximately 50% and approximately 80% of a thickness of the thermal spray coating.

9. The method of claim 1, wherein the LTA process cleans the textured surface of contaminants.

10. The method of claim 1, wherein the LTA process is performed with an LTA tooling having one or more lasers.

11. A method of manufacturing an engine block to prevent scrapping of an out of specification engine block, the method comprising:
   providing an unfinished engine block having at least one cylinder bore;
   performing a pre-bore operation on the at least one cylinder bore;
   performing a surface activation operation to provide a textured substrate surface in the at least one cylinder bore;
   performing a first thermal spray coating operation to deposit a first thermal spray coating on the textured substrate surface;
   performing a honing operation on the at least one cylinder bore;
   determining at least a portion of the first thermal spray coating is out of specification;
   performing a laser texture ablation (LTA) process on the first thermal spray coating to remove at least a portion of the first thermal spray coating and leave a textured surface; and
   performing a second thermal spray coating operation by spraying a second thermal spray coating on the textured surface of the first thermal spray coating, to thereby prevent scrapping of the engine block with the out of specification thermal spray coating.

12. The method of claim 11, further comprising performing a honing operation on the second thermal spray coating to provide a surface finish and final dimensional size to accept a piston and ring assembly.

13. The method of claim 11, wherein the first thermal spray coating has a thickness of approximately 150 microns.

14. The method of claim 13, wherein the LTA process removes approximately 50 microns of thickness of the first thermal spray coating.

15. The method of claim 14, wherein the second thermal spray coating has a thickness of at least approximately 50 microns.

16. The method of claim 11, wherein the LTA process removes between approximately 30% and approximately 50% of a thickness of the first thermal spray coating.

17. The method of claim 11, wherein the LTA process removes approximately one third of a thickness of the first thermal spray coating.

18. The method of claim 11, wherein the LTA process removes between approximately 50% and approximately 80% of a thickness of the first thermal spray coating.

19. The method of claim 11, wherein the LTA process cleans the textured surface of contaminants.

20. The method of claim 11, wherein the LTA process is performed with an LTA tooling having one or more lasers.

\* \* \* \* \*